United States Patent [19]

Nakayama

[11] Patent Number: 4,706,237

[45] Date of Patent: Nov. 10, 1987

[54] DISC PLAYER WITH STROBE LIGHT ILLUMINATION

[75] Inventor: Mitsuhisa Nakayama, Kanagawa, Japan

[73] Assignee: U.S. Philips Corporation, New York, N.Y.

[21] Appl. No.: 779,769

[22] Filed: Sep. 25, 1985

[30] Foreign Application Priority Data

Oct. 5, 1984 [JP] Japan ............................ 59-150282[U]
Oct. 5, 1984 [JP] Japan ............................ 59-150283[U]
Nov. 2, 1984 [JP] Japan ................................. 59-230348

[51] Int. Cl.$^4$ ......................... G11B 17/04; G11B 3/62
[52] U.S. Cl. .................................. 369/75.1; 369/752; 369/264; 369/292
[58] Field of Search .................... 369/75.2, 75.1, 264, 369/292

[56] References Cited

U.S. PATENT DOCUMENTS

| 1,641,136 | 8/1927 | Dorn | 369/264 |
| 1,933,305 | 10/1933 | Belt | 369/264 |
| 4,509,157 | 7/1985 | Morinaga | 369/75.2 |

FOREIGN PATENT DOCUMENTS

| 822174 | 12/1937 | France | 369/75.2 |
| 644778 | 10/1950 | United Kingdom | 369/75.2 |

OTHER PUBLICATIONS

*Physics,* D. C. Heath and Company, Copyright 1960, p. 14.

Primary Examiner—Steven L. Stephan
Attorney, Agent, or Firm—F. Brice Faller

[57] ABSTRACT

A disc player comprises a housing (1), a rotatable turntable (5) having a non-vertical axis and a pressure member (58) for urging the disc (11) against the turntable (5) the pressure member (58) is positioned coaxially to the axis of the turntable (5) on a pressure arm 52 which is movable toward and from the turntable (5). The turntable (5) is located so that it is visible at the front of the housing (1). The turntable is covered with a cover (3), which has a transparent front surface and which is movably arranged at the front of the housing (3) between an opened and a closed position. A strobe light emitting device (207) is located on said pressure arm (52) to illuminate the surface of the disc (11), when it is urged against the turntable (5).

16 Claims, 10 Drawing Figures

4,706,237

DISC PLAYER WITH STROBE LIGHT ILLUMINATION

BACKGROUND OF THE INVENTION

The invention relates to a disc player of the type comprising a housing, a rotatable turntable having a non-vertical axis and a pressure member for urging the disc against the turntable. The pressure member is positioned coaxially to the axis of the turntable and is movable toward and from the turntable.

A conventional disc player is known from U.S. Pat. No. 2,007,054 and is constructed with the turntable located in the middle part of the housing.

Interest is being shown in disc players in which the turntable is located in a position in which it can be seen at the front of the housing and in players where it is possible to see from the outside the disc, from which the recorded information is being reproduced.

SUMMARY OF THE INVENTION

The invention has for its object to provide a disc player constructed so that the disc from which the recorded information is being reproduced can be seen in its entirety from the outside, with which the words and symbols displayed on the disc can be read even though the disc is being rotated at a fairly high speed.

The invention is characterized in that the turntable is located in the housing in such position that it is visible at the front of the housing and is covered with a cover, which has a transparent front surface and which is movably arranged at the front of the housing between an opened and a closed position. The pressure member is located on a pressure arm, which is movable toward and from the turntable, and a strobe light emitting device is located on the pressure arm to illuminate the surface of the disc when it is urged against the turntable.

With such a disc player the disc from which the recorded information is being reproduced is completely visible from the outside through the front cover. Furthermore as long as the front cover is opened and closed automatically there will be damaging of the disc or the turntable by foreign matter introduced from the outside while reproduction is in progress.

If the strobe light emitting device is made to emit light at a frequency with the same period as a single rotation of the disc, which is preferably a so called compact disc, then the disc will be illuminated in the same position each time and the disc can be observed easily from the outside while the recorded information is being reproduced.

If just one point on the rotating disc is observed it will always be illuminated with the flash in the same position along the path of its rotation, which is to say that the point will appear to be stationary. Consequently it is possible to read off the words and symbols which are displayed on the disc clearly in just the same way as if the disc was stationary even though it is in fact rotating. Hence it is possible to read out all the information which has been provided on the disc while it is being played and this is useful for selecting which information is to be reproduced next.

The axis of rotation of the turntable is inclined upwardly from the horizontal so as to reduce the vertical dimension of the housing, maintaining the ability to see the disc at the front of the housing. In one embodiment the pressure arm is formed as an elongated frame which carries the pressure member in its middle part and has an aperture on either side of the pressure member, the strobe light emitting device comprising two light emitters, which are fitted in said apertures. Thus, there are provided strobe light emitters at locations facing the disc at both sides of the pressure member. It is thereby possible to ascertain all details, which are displayed on the disc.

In another embodiment the player comprises a loading mechanism, having a drawer, which is rectilinearly movable between an opened and a closed position. The drawer carries a disc receiving plate, which is freely movable within a hole of the drawer in upward and downward direction parallel to the axis of rotation of the turntable, which hole has a diameter slightly larger than that of the disc, the arrangement of the pressure arm being such that it can move with the pressure member through said hole during its movement toward and from the turntable. The drawer is movable out and in horizontally at the front of the housing and to the disc is given up an accepted via the disc receiving plate which match up with the drawer.

DETAILED DESCRIPTION OF THE INVENTION

Figure 1:
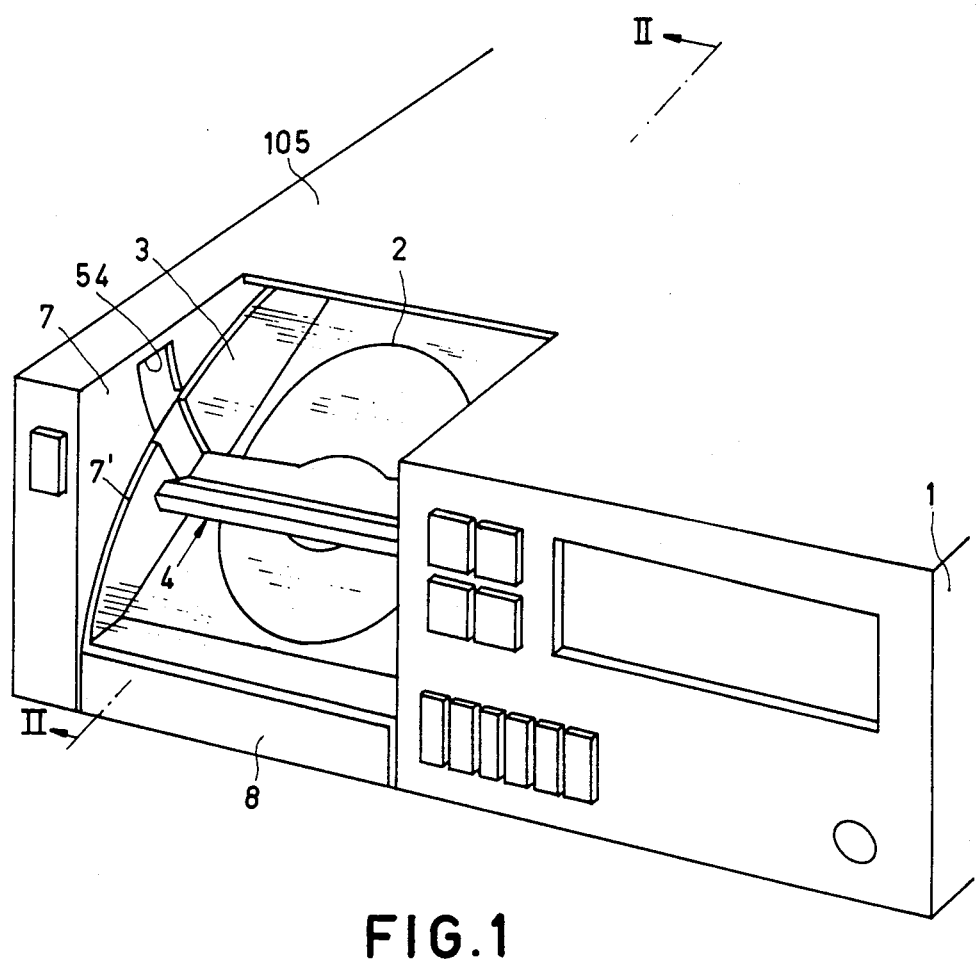
FIG. 1 is a perspective of the front part of a disc player.
Figure 2:
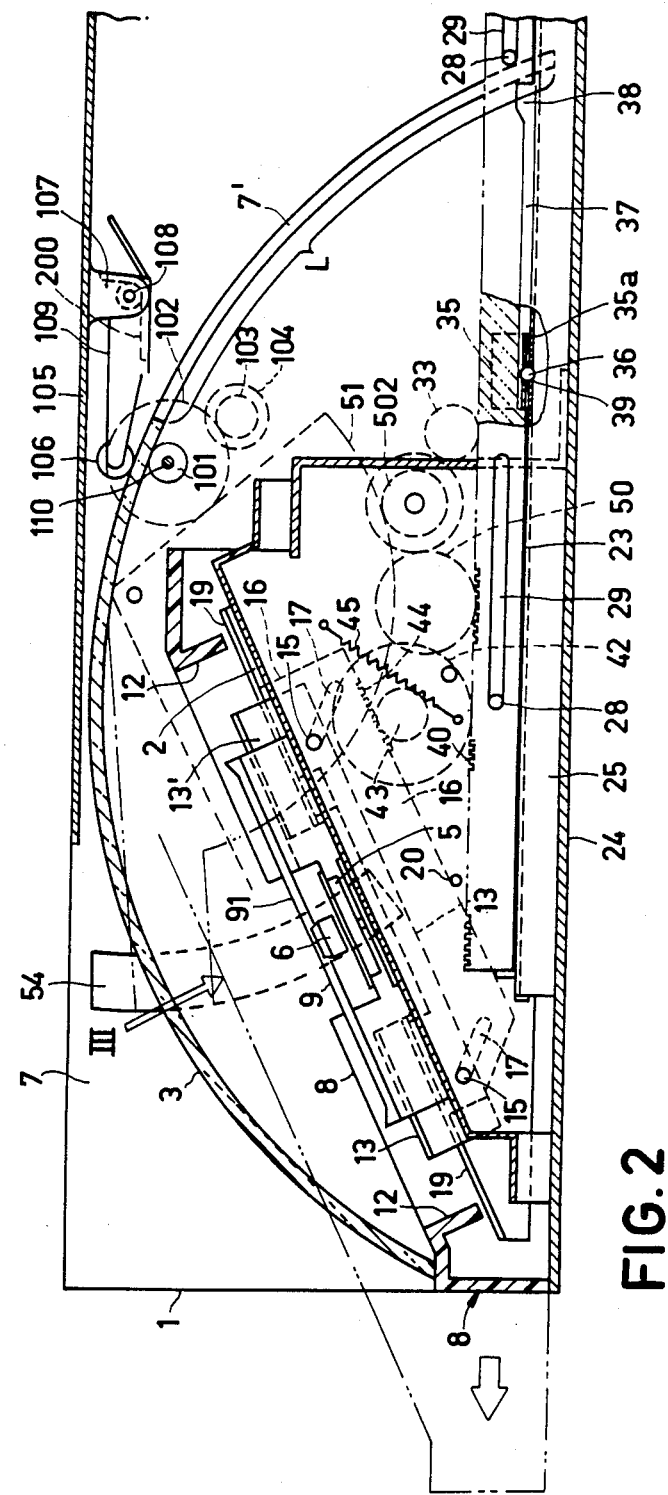
FIG. 2 is a cross sectional view in the direction of the arrows along the line II—II in FIG. 1.
Figure 3:
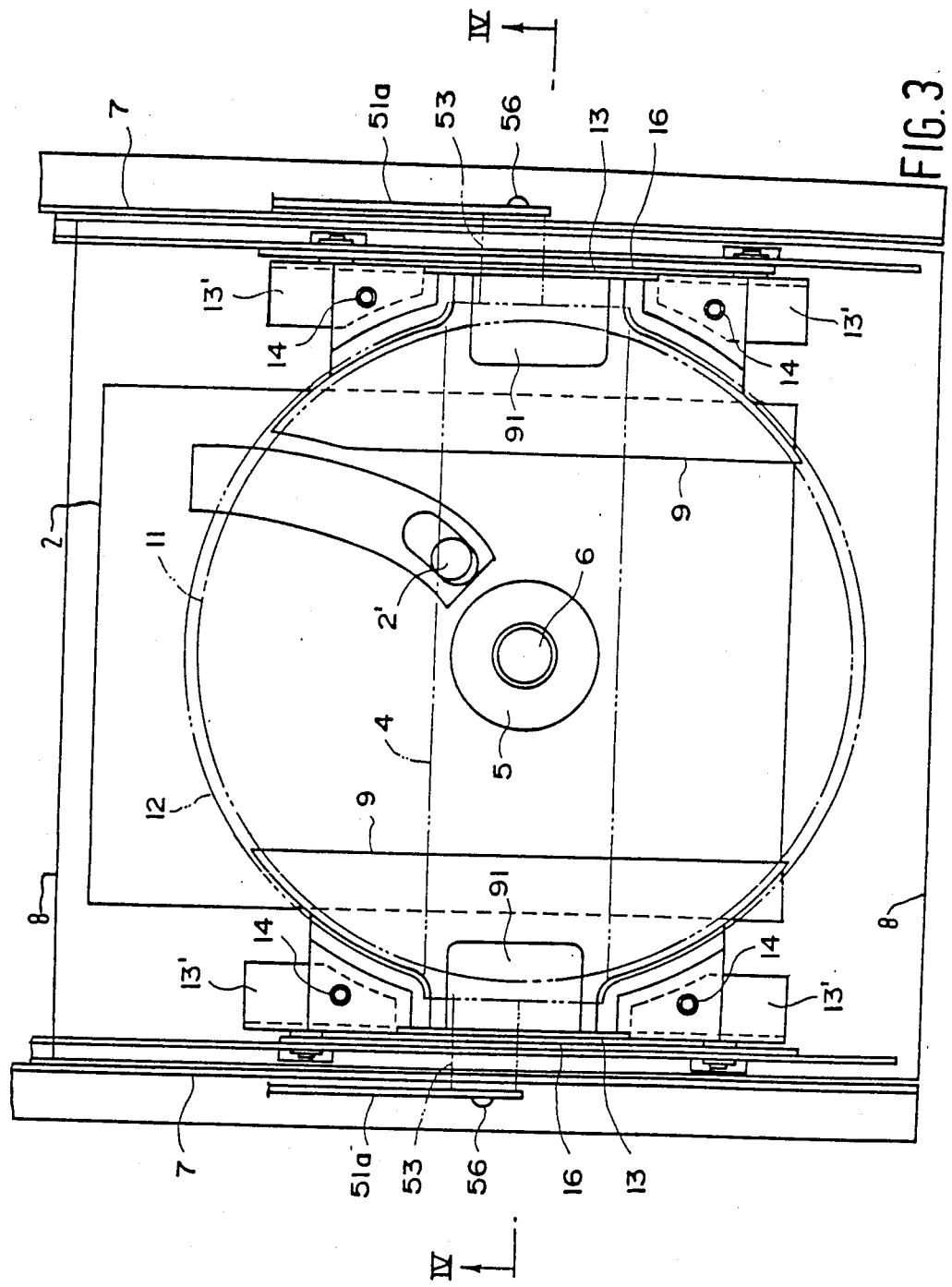
FIG. 3 is a cross sectional view in the direction of the arrows along the line III—III in FIG. 2.

The front part of a disc player of this invention, in the form of a so-called compact disc player, is shown in FIG. 1. The player comprises a housing 1, a player body 2, which is located to be visible at the front of the housing, a transparent cylindrically shaped front cover 3 which can be opened and closed freely and which covers the front of the housing 1, a pressure equipment 4 and a loading device, formed by a drawer 8, As shown in FIG. 2, the player body 2 is located with a downward inclination of about 25° towards the front relative to the horizontal. The player body 2 comprises a turntable 5 and a spindle 6, which are located protruding in the centre of the player body and the turntable 5 is driven round by a motor 5' (see FIG. 4). In FIG. 3, 2' is an information read out part.

The front cover 3 is moulded from a highly transparent acrylic resin and the shape is curved with an appropriate radius of curvature (for example R about 150 mm) so as to fit player body 2 closely in the opening/closing orientation (the left/right orientation in FIG. 2) and such that the front can be opened and closed while retaining a compact form. Thus, as shown in detail in FIG. 9, the front cover 3 has its side parts engaged so as to slide freely in guide grooves 7', which have the same radius of curvature as the front cover 3 and which are located in side plates 7, 7 of the housing 1. The guide grooves 7' have a width slightly greater than the thickness of the front cover 3 and they are established with an extra length L which provides for the opening/closing stroke on the inside, taking a position above the top surface of the front part of the drawer 8 which covers the top of the player body 2 as the cardinal point (FIG. 2).

Figure 9:
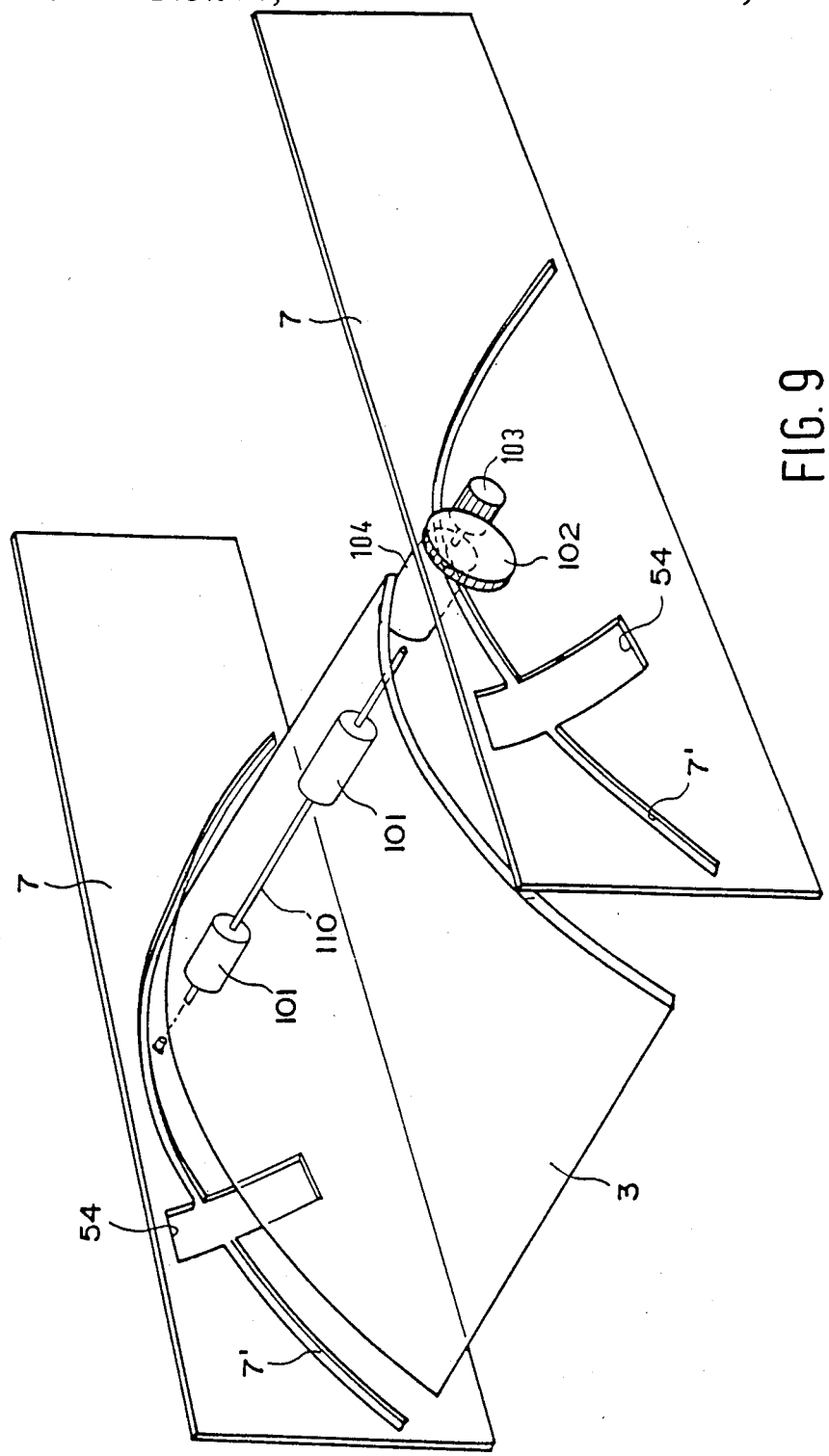
FIG. 9 is a perspective of the mechanism of the front cover.

In FIGS. 2 and 9, rubber drive rollers 101 are shown of cylindrical form which make a press contact with the inner surface of the front cover 3 and provides a drive device for the opening and closing of the front cover 3. A rotating shaft 110 is supported to rotate freely in the side plates 7, 7. A gear wheel 102 is fitted to the end of the rotating shaft 110 on the outside of the plate 7 and is engaged with a drive pinion 103 of a motor 104 which is located between the plates 7, 7.

As shown in FIG. 2, push rollers 106 are in press contact with the top surface of the front cover 3 at pins opposite drive rollers 101 and are established on the inside of a cover plate 105 which covers over the top of the housing 1. The push rollers 106 rotate freely on the end of a swinging arm 109 which pivots about a pin 108 fixed to a bracket 107 on the inner surface of the cover plate 105. The swinging arm 109 is normally subjected by means of a screw coil spring 200 to a rotating moment which pushes the push roller 106 in the direction of the front cover 3.

Hence when the motor 104 is started the front cover 3 is opened or closed by the driver rollers 101, 101.

Figure 5:
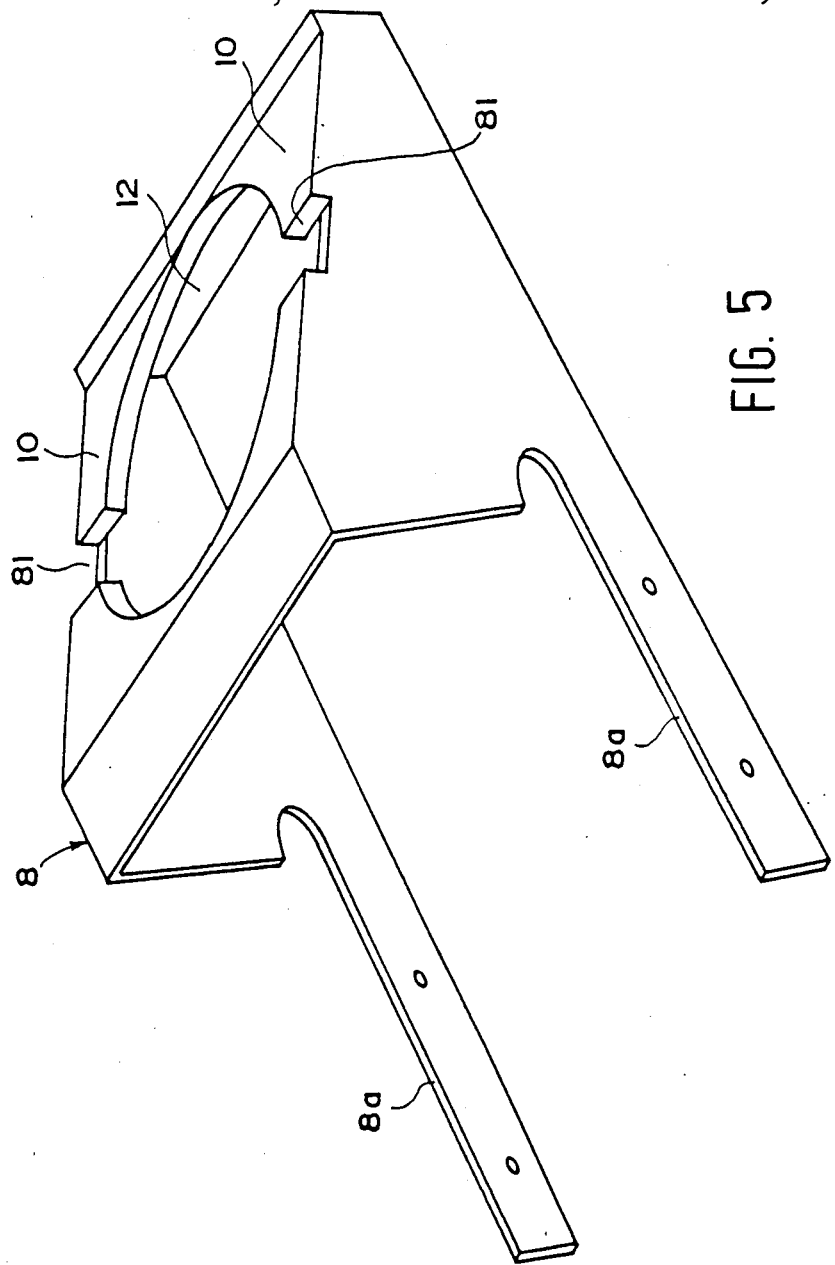
FIG. 5 is a perspective of the drawer.

The overall form of the drawer 8 is shown in FIG. 5 and it has a through hole 12 located in a position concentric with the turntable 5 and with a diameter some 1–2 mm greater than that of a disc 11 in the inclined part which is approximately parallel with the player body 2. The hole 12 is formed with a cylindrical shape with the edges of the hole in the drawer 8 folded over some 10 mm to the inside in order to provide a screen which covers the internal mechanism.

Figure 6:
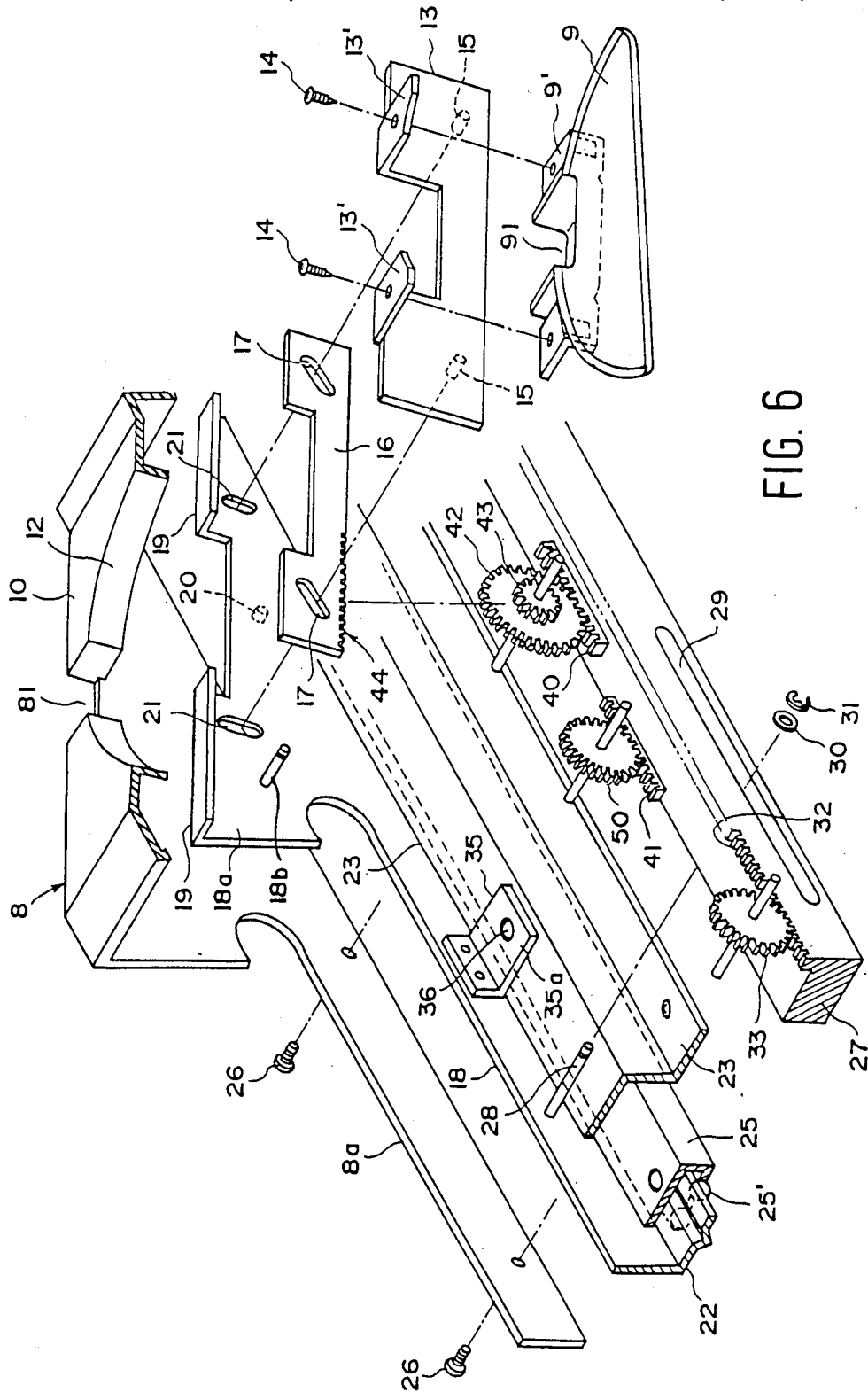
FIG. 6 is an exploded perspective of the drawer and the disc receiving plates.

Referring to FIGS. 2, 3, and 6, two disc receiving plates 9 located inside through hole 12 take the form of crescent shaped plates 30 mm wide and of like radius or disc 11. These plates are established symmetrically on the left and right hand sides of through hole 12 and are moulded from a synthetic resin as one with supporting parts 9' are fitted with screws 14 and fixed to brackets 13', 13' of a raising and lowering plate 13. The bracket 13' are formed by folding the upper edges of the raising and lowering plate 13 inwards through an angle of about 90°.

The raising and lowering plates 13 each have two supporting shafts 15, 15 which are fixed left and right facing outwards and these pass through inclined slits 17, 17 which are inclined towards the front by about 45° in left and right hand drive plates 16. The supporting shafts 15, 15 also pass through guide slits 21, 21 which are parallel with the axis of rotation of the turntable 5 in the top part 18a of roughtly triangular shaped slide frames 18 which are fitted with slide washers etc. and stopped from the opposite side. Thus the raising and lowering plates 13 are established to slide freely in the direction of the guide slits 21.

The top edges of top parts 18a are inclined at an angle parallel with the inclination of the player body 2 and the drive plates 16 slide along inside guide pieces 19 which are formed by folding the top edges over at right angles. The lower edges drive plates 16 slide on pins 20 which are fixed to the top part 18a.

Figure 4:
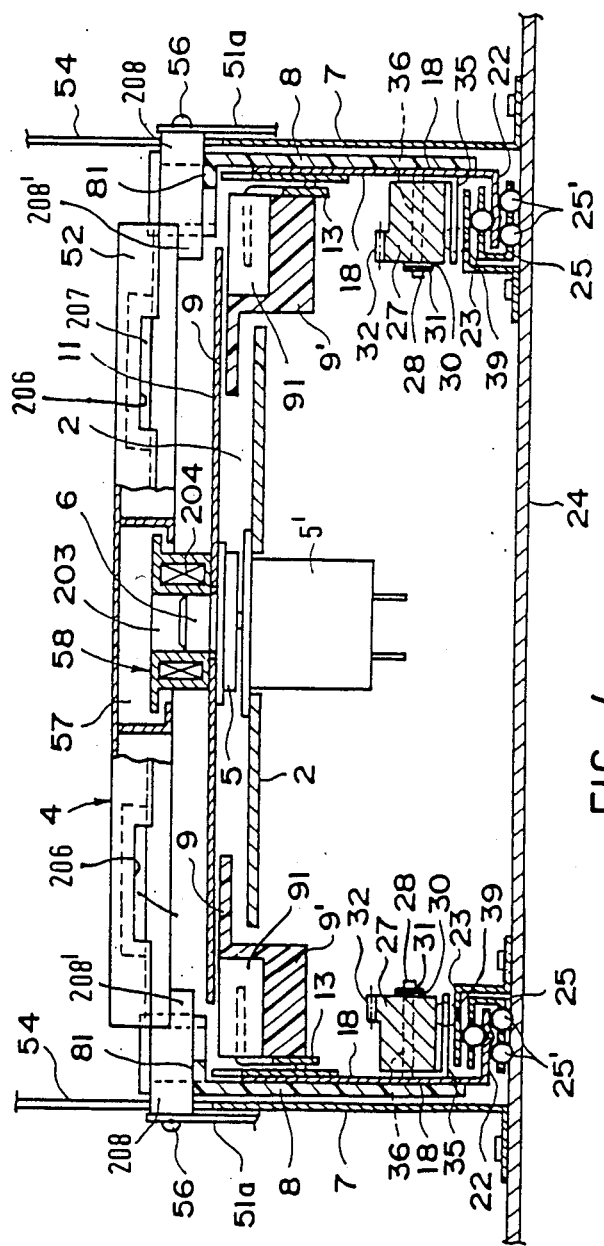
FIG. 4 is a cross sectional view in the direction of the arrows along the line IV—IV in FIG. 3.

Referring to FIG. 4, slide frames 18 have folded parts 22 which are formed at the lower edge supported to slide freely by ball bearings 25 which are retained in fixing jigs 23 which have a roughly Z shaped transverse cross section. The ball bearings 25 are such that the folded parts 22 of the slide frames 18 can slide with very little friction, the movement being accompanied by the rotation of the balls 25' on the top of the base 24. Arm parts 8a of drawer 8 are fitted and fixed to the outsides of the slide frames 18 with screws 26, 26 and the two parts move in unison.

Figure 8:
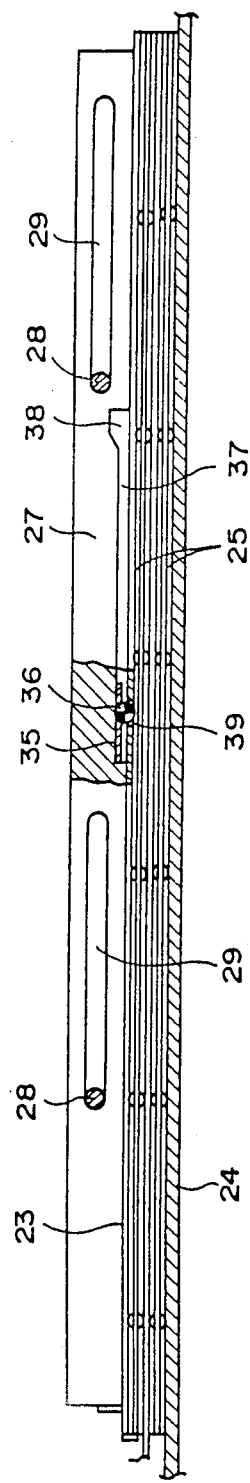
FIG. 8 is a sectional view of the operating mechanism.

Approximately square section gear rack members 27 slide freely in the same direction as the slide frames 18 on the top surfaces of the fixing jigs 23. In FIG. 8, pins 28 are shown, which are fixed roughly at right angles to the inside of the slide frames 18. Pins 28 pass through the said slots 29 located along the length of the flanks of the rack members 27 and are stopped from this side with slide washers 30 and rings 31. Slots 29 are slightly wider than the external diameter of the pins 28 and they are formed with a length equal to the extent of the movement of the slide frames 18, when moved with the rack members 27.

Figure 7:
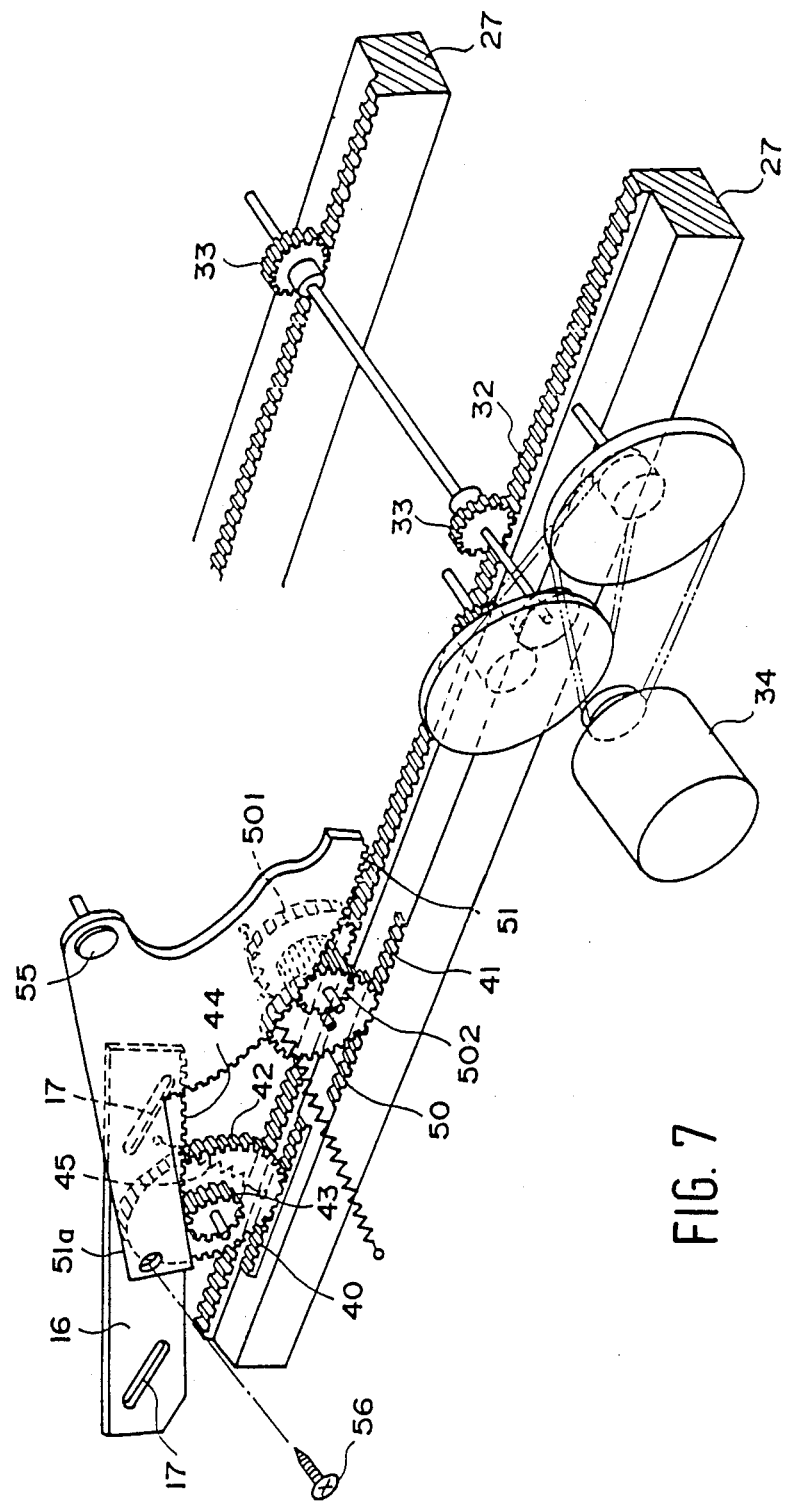
FIG. 7 is a perspective of the essentials of the connections which are made with the rack rods.

Referring to FIG. 6, first tooth portions 32 are formed along more or less the whole length on about the inner one third of the top surfaces of the rack members 27 and engage motive pinions 33 which are driven by a motor 34 (see FIG. 7). The positions of the motive pinions are fixed.

Thus the rack members 27 can be reciprocated at a constant speed by the motive pinions 33 which can be driven forward and in reverse by the motor 34 until the pins 28 engage with the left or right ends of the slots 29. Consequently the slide frames 18 and the drawer 8 are moved together with the movement of the rack members 27.

It is described below how to stop the slide frames 18 and the drawer 8 at precisely the given position while the pins 28 are sliding in the slots 29.

L shaped ball retaining parts 35 are fixed to the inner surfaces of the slide frames 18 with horizontal parts 35a parallel to the sliding surfaces of the rack members 27 and the fixing jigs 23. A single ball 36 is retained loosely in the centre of the horizontal part 35a of each of the ball retaining parts 25 and the lower halves of balls 36 are retained in holes 39 in the fixing jigs 23 (see FIG. 8).

As shown in detail in FIG. 8, deep restricting grooves 37 are provided along rack members 27 to house the upper halves of the balls 36 such that the balls 36 can slide the length of the grooves 37. A release concavity 38 of a depth which is able to house the whole of the ball 36 is established at the right hand end of the said restricting groove 37. The length of the restricting grooves 37 is equal to the length of the slots 29 in the racks members 27.

Furthermore when the rack members 27 are moved to the left from the position shown in FIG. 8 the balls 36 are retained in the holes 39 of the fixing jigs 23 and pushed into the restricting grooves 37. Thus the ball retaining parts 35 which are fixed to the frames 18 and the drawer 8 are held in a static condition, even if a fairly large force is imposed, on account of the friction force with the rack members 27.

However, immediately before the pins 28 make contact with the right hand ends of the slots 29 the release concavities 38 reach the positions of the balls 36 and the restricting force due to the pressing of the balls is eliminated. Consequently when the passive pins 28 press on the right hand end of the slots 29 the balls 36 have floated out of the holes 39 of the fixing jigs 23. Hence the slide frames 18 and the drawer 8 are moved to the left along with the rack members 27, the ball retaining parts 35 and the balls 36 in this condition.

In other words the drawer 8 and the disc receiving plates 9 in FIG. 2 are advanced so as to protrude forwards for the ejection or insertion of a disc 11.

The motive pinions 33 are then driven in reverse and the rack members 27 are moved to the right in FIG. 8. At this time the movement starts with the balls 36 floated up into the release concavities 38 and so the drawer 8 and the slide frames 18 (and hence the disc receiving plates 9) are moved to the right in unison with the rack members 27. However the drawer 8 and the slide frames 13 are stopped at the position in which the balls 36 enter into the holes 39 of the fixing jigs 23 and then only the rack members 27 move to the right with the surfaces of the balls 36 sliding in the restricting grooves 37, returning to the position which is shown in FIG. 8.

As shown in FIG. 7, second tooth portions 40 and third tooth portions 41 of a prescribed length are formed along the length orientation on the top surfaces of rack members 27, each with a tooth width of about one third of the width of the surface which remains after excluding the tooth portion 32.

Secondary gear wheels 42 which engage with the tooth portions 40 are located on the slide frame 18 and pinions 43 which are formed as one with secondary gear wheels 42 engage racks 44 which are formed on the bottom edges of the drive plates 16. Tension springs 45 which restrict the rotations of the secondary gear wheels 42 are connected between the secondary gear wheels 42 and pins 18b which are established on the top parts 18a of the slide frames 18.

When the rack members 27 are moved to the left from the position shown in FIG. 8, the secondary gear wheels 42 and the tooth portions 40 are engaged from the start of the movement only along the length of the slot 29. As a result of this the drive plates 16 are moved to the left in FIG. 6 so that inclined slits 17 press on shafts 15 and ultimately the shafts are raised along guide slits 21 in the top parts 18a. Thus the raising and lowering plates 13 which are fixed relative to supporting shafts 15 and the disc receiving plates 9 move parallel to the axis of rotation of the turntable 5 to assume the position shown in FIG. 2.

In other words, as shown in FIG. 4, the disc receiving plates 9 which are at a position slightly below the disc 11, which has been pressed onto the turntable 5, are raised to a position more or less level with the upper edge of the through hole 12 of the drawer 8 and then stop. Hence the disc 11 which is on the turntable 5 and from which the pressure member has been released by the pressure equipment 4 is lifted.

The design is such that the rotation of the secondary gear wheel 42, which is required to provide the above mentioned lifting stroke for the disc receiving plates 9, is less than 180°. Thus the tension springs 45 are stretched and the members 27 move in unison with the slide frames 18, so that rotation of the secondary gear wheels 42 is stopped and the disc receiving plates 9 are fixed in the raised position.

Hence the removal of the fitting of a disc 11 can be achieved easily since the drawer 8 and the disc receiving plates 9 are pushed out forwards, to the left in FIG. 2.

Recesses 81 and 91 into which a finger can be inserted easily are located on the right and left hand sides of the drawer 8 and the disc receiving plates 9 respectively in order to facilitate the removal or fitting of the disc 11 (FIG. 3).

The disc receiving plates 9 are retained in the raised position as the drawer 8 is being retracted until it reaches the limit of its retraction and stops, whereupon the secondary gear wheels 42 start to move in engagement with the tooth portions 40. Consequently the drive plates 16 are moved to the right in FIG. 6 and the raising and lowering plates 13 and the disc receiving plates 9, which are attached to the raising and lowering plates 13, descend along the axis of rotation line of the turntable 5 in the guide slits 21 as a result of the action of the inclined slits 17. That is to say the disc receiving plates 9 sink in the through hole 12, placing the disc 11 on the turntable 5, and then stop on reaching a slightly lower position (see FIG. 4).

Secondary gear wheels 42 and the tooth portions 40 disengage at this stop position and the bottom position of the disc receiving plates 9 is maintained by the restricting force of the tension spring 45. Thus the tooth portion 40 is formed in the position and with the length required to enable to disc receiving plates 9 to be operated in the way described above.

The other tooth portion 41, which are formed on the upper surfaces of the rack members 27, engage with secondary gear wheels 50 and these form gear wheel trains with pinions 502 which are engaged with sector gears 51 on the pressure equipment 4. The pressure equipment 4 is constructed with a drive originating from the movement of the rack member 27. Thus only one motor is required for the operation of the pressure equipment 4, the drawer 8 and the disc receiving plates 9.

Figure 10:
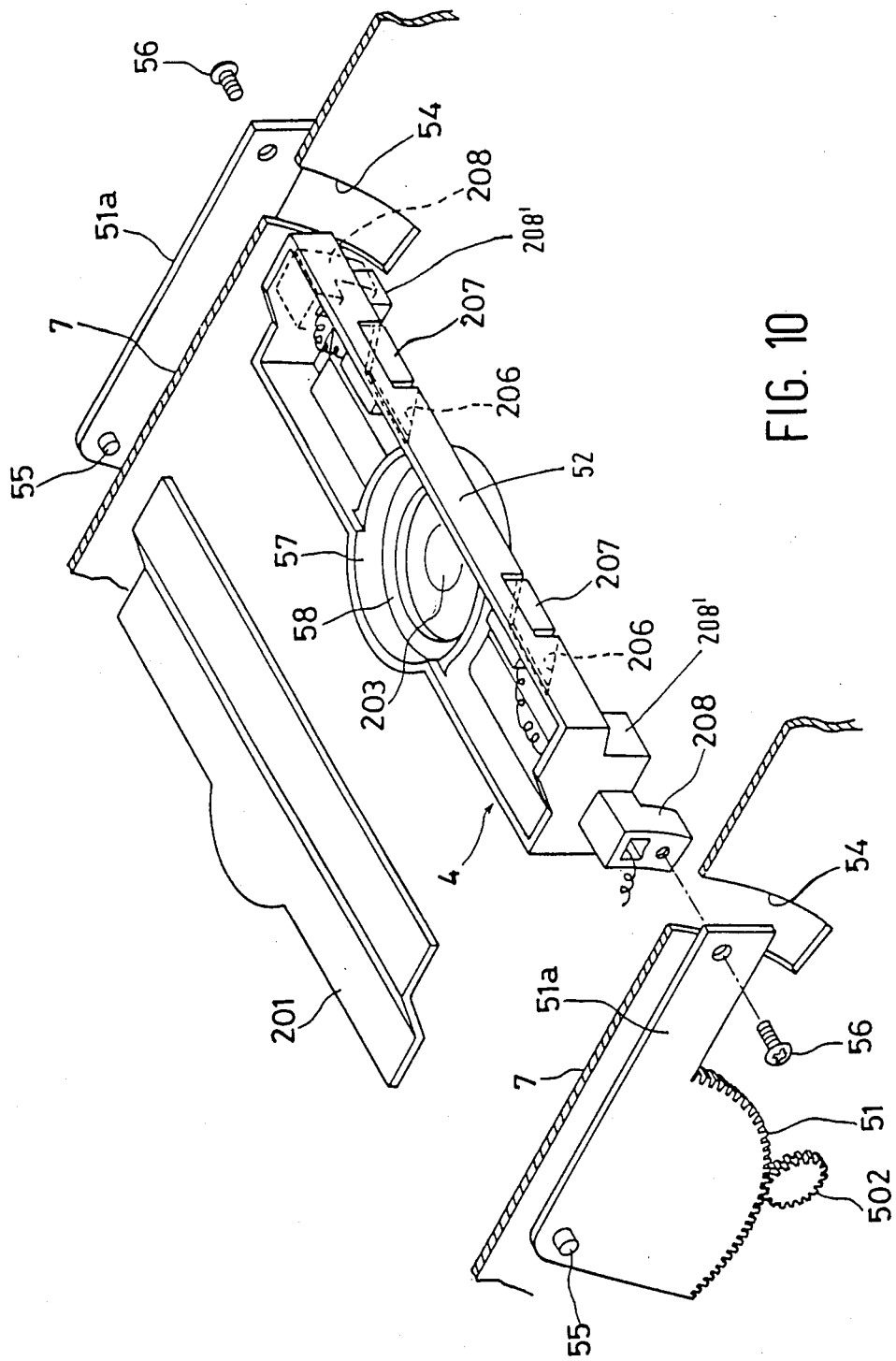
FIG. 10 is an exploded perspective of the pressure equipment.

The pressure equipment 4 comprises a pressure arm 52, which is formed as a hollow framework of long thin plates and which has a width of about 30 mm, a height of about 10 mm and a length of about 200 mm, as shown in detail in FIGS. 4 and 10. The hollow part is closed by a cover plate 201. A holder chamber 57, which has the form of a vertically orientated cylinder, is formed roughly in the middle part of the pressure arm 52 and a pressure member 58 is located inside holder chamber 57. The pressure member 58 has a hole 203 of a size which can accommodate the spindle 6 at its centre and a magnet 204 in its peripheral parts around this hole. The pressure member 58 is located with a certain amount of free play in the vertical direction in order to provide a stroke of a few millimeters inside the holder chamber. The pressure member 58 is attracted to the tunrtable by the effect of the magnet 204 within the range of its free play so that the disc 11 is restrained and held firmly between the pressure member 58 and the turntable 5.

A strobe light emitting device comprising two emitters 207 is fitted facing downwards in apertures 206 located at the underside pressure arm 52 at roughly symmetrical positions on either side of the pressure member 58. If the strobe light emitters 207, are made to emit light at a frequency which has the same period as the rotation of the disc 11 by means of a synchronising circuit then the disc will be effectively illuminated at the same position on each rotation. Hence it is possible to read the words and symbols displayed on the disc 11 exactly as though it was in a stationary condition.

The pressure arm 52 has square pillar like supporting arms 208, 208 arranged symmetrically on its two edges. These supporting arms 208 are formed with downward facing protrusions 208' which extend downwards for about 5 millimeters from the lower surface of the pressure arm. The supporting arms 208, 208 protrude through arc shaped apertures 54, 54 which are located in the plates 7, 7 on either side and they are supported by coupling with screws 56 to rotating arms 51a, which are located on the outer surfaces of side plates 7. The rotating arms 51a are integral with the sector gears 51 which are fitted so as to rotate about shafts 55 on the outside of the plates 7. The sector gears 51 are engaged with the pinons 502, which are formed as one with the gear wheels 501. The pinions 502 engage the secondary gear wheels 50, which engage tooth portions 41 to provide a motive force.

Thus the pressure arm 52 is supported for movement along an arc such that the centre of the pressure arm 58 conforms with the axis of rotation of the turntable 5. The arc shaped apertures 54 have shafts 55 as centre of curvature and they are formed with a length corresponding to the rotary stroke of the pressure arm 52. Hence when the front cover 3 has been fully opened by the motor 104, the pressure arm 52 is rotated upwards to the upper limit, by the engagement of the secondary gear wheels 50 and the tooth portions 41 as the rack members 27 move, whereupon a disc 11 may be set on the turntable 5 of the player body 2.

Once the disc 11 has been set and the rack members 27 are moved in the reverse direction, the pinions 502 are rotated in reverse and the pressure arm 52 is lowered by the engagement with the sector gear wheels 51 (FIG. 7). Furthermore the disc 11 is clamped onto the turntable by the pressure member 58. Then if a signal for resetting the disc 11 is input, the pinion 502 is again driven in the reverse direction and the pressure arm 52 is raised to its upper limit position, after the front cover 3 has been fully opened, and it is then possible to reset the disc 11.

Downward facing protrusions 208' are formed as one with the supporting arms 208 on the above mentioned pressure arm 52. Thus the descent of the descending pressure arm 52 is stopped by the contact of the protrusions 208' with the bottoms of the recesses 81 of the drawer 8 (FIG. 4).

Hence the stop position of the pressure arm 52 is defined mechanically and structurally as the position at which contact is made between the protrusions 208' and the bottoms of the recesses 81. In this way the stop position of the pressure arm 52 is maintained positively and mechanically so that clamping of the disc 11 by the pressure member 58 is always achieved precisely and positively. Hence there is no problem with poor reproduction due to overloading.

What is claimed is:

1. A disc player, comprising a housing, a rotatable turntable having a non-vertical axis and a pressure member for urging the disc against the turntable, which member is positioned coaxially to the axis of the turntable and is movable toward and from the turntable, characterized in that the turntable is located in the housing in such position that it is visible viewed at the front of the housing, the turntable is covered with a cover, which has a transparent front surface and which is movably arranged at the front of the housing between an opened and a closed position, the pressure member is located on a pressure arm, which is movable toward and from the turntable and is formed as an elongated frame which carries the pressure member in its middle part a strobe light emitting device is located on said pressure arm to illuminate the surface of the disc when it is urged against the turntable, said strobe light emitting device emitting light at a frequency with the same period as a single rotation of the disc and comprising two strobe light emitters, said emitters being carried by said elongated frame on either side of said pressure member.

2. A disc player as claimed in claim 1, characterized in that the cover has a cylindrical shape and comprises side parts, which are slidably arranged in guide grooves, which are located in side plates of the housing, and which have the same radius of curvature as the cover.

3. A disc player as claimed in claim 1 or 2, characterized in that the player comprises a loading mechanism, having a drawer, which is rectilinearly movable between an opened and a closed position, the drawer carries a disc receiving plate, which is freely movable within a hole of the drawer in upward and downward direction parallel to the axis of rotation of the turntable, which hole as a diameter slightly larger than that of the disc, the arrangement of the pressure arm being such that it can move with the pressure member through said hole during its movement toward and from the turntable.

4. A disc player as claimed in claim 3, characterized in that the pressure arm comprises supporting parts, which protrude through arc shaped apertures, located in the side plates of the housing, said drawer is further provided with a recess on both sides of the hole, the downward movement of said supporting parts is stopped by the contact of the parts with the bottoms of said recesses.

5. A disc player as claimed in claim 3, characterized in that the drawer is integrally connected to a sliding frame, on which the disc receiving plate is mounted, there is provided a gear rack member comprising a first toothed portion which is engaged with a pinion, which is rotated by a motor and which gear rack member is slidable in a direction parallel to the direction of movement of the drawer and which can be coupled with either said drawer or sliding frame, such that the disc receiving plate can be coupled with said second toothed portion for upward and downward movement within said hole.

6. A disc player as claimed in claim 4, characterized in that the drawing is integrally connected to a sliding frame, on which the disc receiving plate is mounted, there is provided a gear rack member comprising a first toothed portion which is engaged with a pinion, which is rotated by a motor and which gear rack member is slidable in a direction parallel to the direction of movement of the drawer and which can be coupled with either said drawer or said sliding frame, such that the disc receiving plate can be coupled with said second toothed portion for upward and downward movement within said hole.

7. A disc player as claimed in claim 1, characterized in that the pressure arm is formed as an elongated frame which carries the pressure member in its middle part.

8. A disc player as claimed in claim 7, characterized in that the elongated frame has an aperture on either side of the pressure member, the strobe light emitting device comprising two strobe light emitters, which are fitted in said apertures.

9. A disc player, comprising a housing, a rotatable turntable having a non-vertical axis and a pressure member for urging the disc against the turntable, which member is positioned coaxially to the axis of the turntable and is movable toward and from the turntable, characterized in that the turntable is located in the housing in such position that it is visible viewed at the front of the housing, the turntable is covered with a cover, which has a transparent front surface and which is movable arranged at the front of the housing between an opened and a closed position, the pressure member is located on a pressure arm, which is movable toward and from the turntable, a strobe light emitting device is located on said pressure arm to illuminate the surface of the disc when it is urged against the turntable, said strobe light emitting device emitting light at a frequency with the same period as a single rotation of the disc, and a loading mechanism, having a drawer, is rectilinearly movable in the housing between an opened and a closed position, the drawer carrying a disc receiving plate, which is freely movable within a hole of the drawer in upward and downward direction parallel to the axis of rotation of the turntable, which hole has a diameter slightly larger than that of the disc, the pressure arm being arranged to move with the pressure member through said hole during its movement toward and from the turntable.

10. A disc player as claimed in claim 9, characterized in that the pressure arm is formed as an elongated frame which carries the pressure member in its middle part, the strobe light emitting device comprising two light emitters, said emitters being carried by said elongated frame on either side of said pressure member.

11. A disc player as claimed in claim 9, characterized in that the cover has a cylindrical shape and comprises side parts, which are slidably arranged in guide grooves, which are located in side plates of the housing, and which have the same radius of curvature as the cover.

12. A disc player as claimed in claim 9, characterized in that the pressure arm comprises supporting parts, which protrude through arc shaped apertures, located in the side plates of the housing, said drawer is further provided with a recess on both sides of the hole, the downward movement of said supporting parts is stopped by the contact of the parts with the bottoms of said recesses.

13. A disc player as claimed in claim 9, characterized in that the drawer is integrally connected to a sliding frame, on which the disc receiving plate is mounted, there is provided a gear rack member comprising a first toothed portion which is engaged with a pinion, which is rotated by a motor and which gear rack member is slidable in a direction parallel to the direction of movement of the drawer and which can be coupled with either said drawer or said sliding frame, such that the disc receiving plate can be coupled with said second toothed portion for upward and downward movement within said hole.

14. A disc player as claimed in claim 12, characterized in that the drawing is integrally connected to a sliding frame, on which the disc receiving plate is mounted, there is provided a gear rack member comprising a first toothed portion which is engaged with a pinion, which is rotated by a motor and which gear rack member is slidable in a direction parallel to the direction of movement of the drawer and which can be coupled with either said drawer or said sliding frame, such that the disc receiving plate can be coupled with said second toothed portion for upward and downward movement within said hole.

15. A disc player as claimed in claim 9, characterized in that the pressure arm is formed as an elongated frame which carries the pressure member in its middle part.

16. A disc player as claimed in claim 15, characterized in that the elongated frame has an aperture on either side of the pressure member, the strobe light emitting device comprising two strobe light emitters, which are fitted in said apertures.

* * * * *